United States Patent [19]
Southwell et al.

[11] 3,784,308
[45] Jan. 8, 1974

[54] METHOD AND APPARATUS FOR MEASURING THE INDEX OF REFRACTION

[75] Inventors: William H. Southwell, Allison Park; Richard M. Walters, Glenshaw, both of Pa.

[73] Assignee: Owens-Illinois, Inc., Toledo, Ohio

[22] Filed: Feb. 9, 1973

[21] Appl. No.: 331,055

[52] U.S. Cl. .............................. 356/128, 35/19 B
[51] Int. Cl. ............................................. G01n 21/46
[58] Field of Search.................... 350/285; 356/128, 356/106; 33/1 L; 35/19 B; 351/6

[56] References Cited
UNITED STATES PATENTS
3,536,383   10/1970   Cornsweet et al..................... 351/6
FOREIGN PATENTS OR APPLICATIONS
97,515   4/1897   Germany........................... 356/128
OTHER PUBLICATIONS
Jenkins and White, Fundementals of Optics, McGraw Hill, New York, 1957 3rd Ed. pp. 20–23.

Primary Examiner—Ronald L. Wibert
Assistant Examiner—Steven Morrison
Attorney—Basil C. Foussianes

[57] ABSTRACT

A method and apparatus for measuring the index of refraction of a cylindrical article of material wherein a beam of radiant energy is divided against a peripheral surface of said article at an acute angle to a tangent thereto, the article is moved relative to the beam in a direction transverse thereto until the transmitted light is autocollimated by a first mirror positioned with its plane at a right angle to the light beam, and thereafter a second mirror is moved until the light reflected from said article is autocollimated and the angular position of the second mirror is measured and the index of refraction is determined by the relationship $n = 2 \cos[(\frac{1}{2})\theta]$ wherein $\theta$ is the angle of incidence and $\pi - 2\theta$ is the angle of movement of the second mirror from a relationship wherein its reflective surface is perpendicular to said beam to the position wherein the reflected light is autocollimated.

12 Claims, 6 Drawing Figures

METHOD AND APPARATUS FOR MEASURING THE INDEX OF REFRACTION

This invention relates to measuring the index of refraction of articles of transparent material.

BACKGROUND OF THE INVENTION

In the measurement of the index of refraction of an article such as that of glass, it is conventional to utilize a prism which is cut out of a piece of glass and then actually measure the angles of incidence and refraction from which the refracted index is determined by Snell's Law.

Such devices necessitate either destroying the article or having an extra piece for use in measurement for the index of refraction and also require accurate visual observation.

Among the objects of the invention are to provide a method and apparatus for inspecting round discs such as lens blanks or lenses without destroying them, without the need for making a prism, which inspection and measurement can be conducted either before or after the blank is made into a complete lens, wherein human error in the accuracy of measurement is minimized, wherein the calculation is achieved directly after measurement of one angle, wherein the light beam is caused to traverse the article being inspected through a plurality of dimensions so that a better indication is achieved of the index of refraction and wherein the only preparatory step for the article being inspected is to grind and polish a peripheral edge.

SUMMARY OF THE INVENTION

The method and apparatus of measuring the index of refraction of a cylindrical article of material in accordance with the invention comprises directing a beam of radiant energy against a peripheral surface of said article at an acute angle to a tangent thereto, moving the article relative to the beam in a direction transverse thereto until the transmitted light is autocollimated by a first mirror positioned with its plane at a right angle to the light beam, and thereafter moving a second mirror until the light reflected from said article is autocollimated, measuring the angular position of said second mirror and determining the index of refraction by the relationship $n = 2 \cos[(½)\theta]$ wherein $n\theta$ is the index of refraction and $\pi - 2\theta$ is the angle of movement of the second mirror from a relationship wherein its reflective surface is perpendicular to said beam to the position wherein the reflected light is autocollimated.

DESCRIPTION

Figure 1:
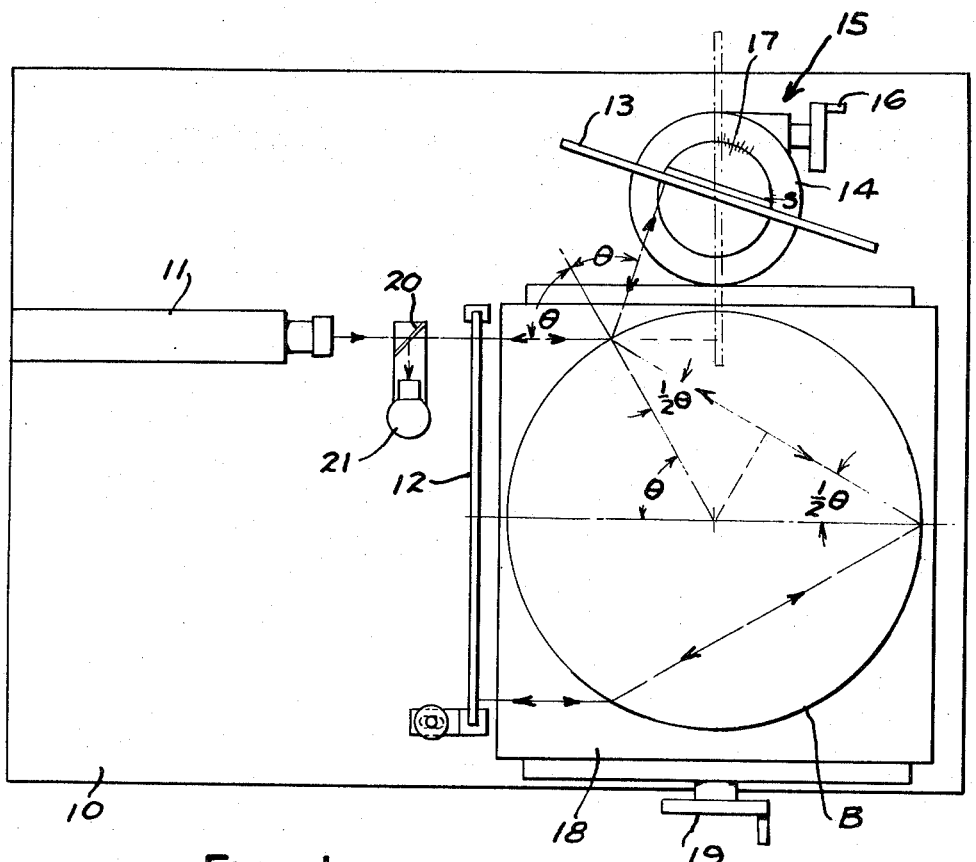
FIG. 1 is a partly diagrammatic plan view of the apparatus embodying the invention.
Figure 2:
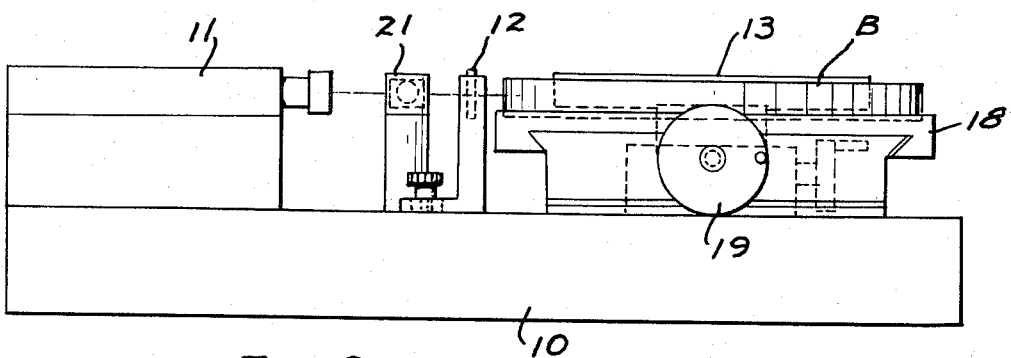
FIG. 2 is an end elevational view of the apparatus embodying the invention.
Figure 3:
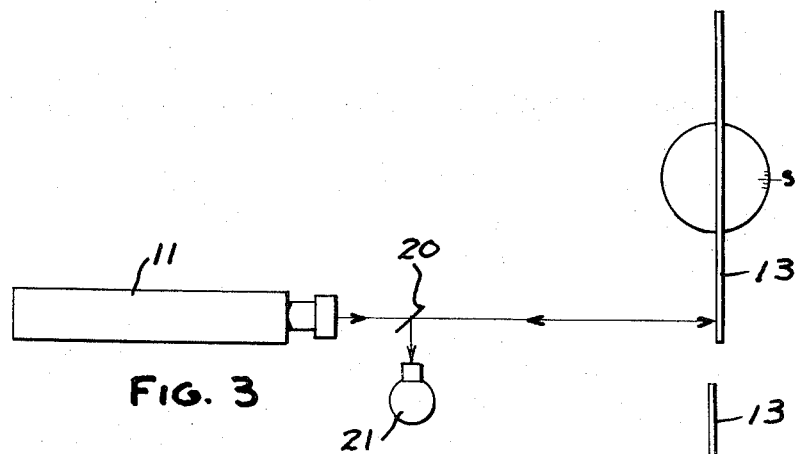
FIGS. 3–6 are diagrammatic drawings of the apparatus showing the relative position of parts during different portions of the method of measuring the index of refraction.
Figure 4:
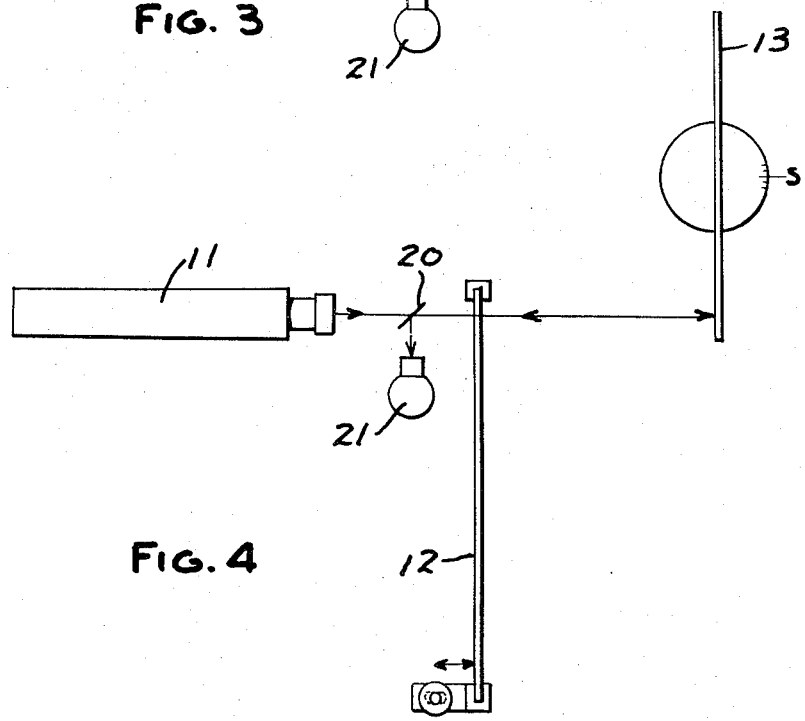
Figure 5:
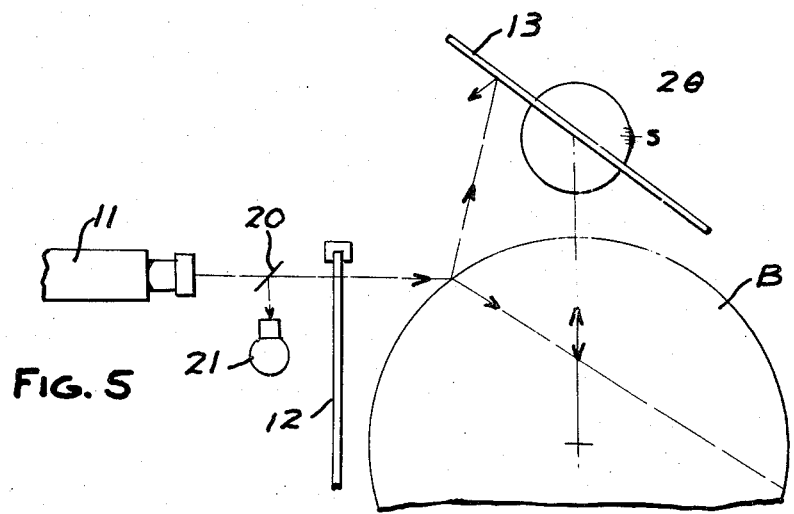
Figure 6:
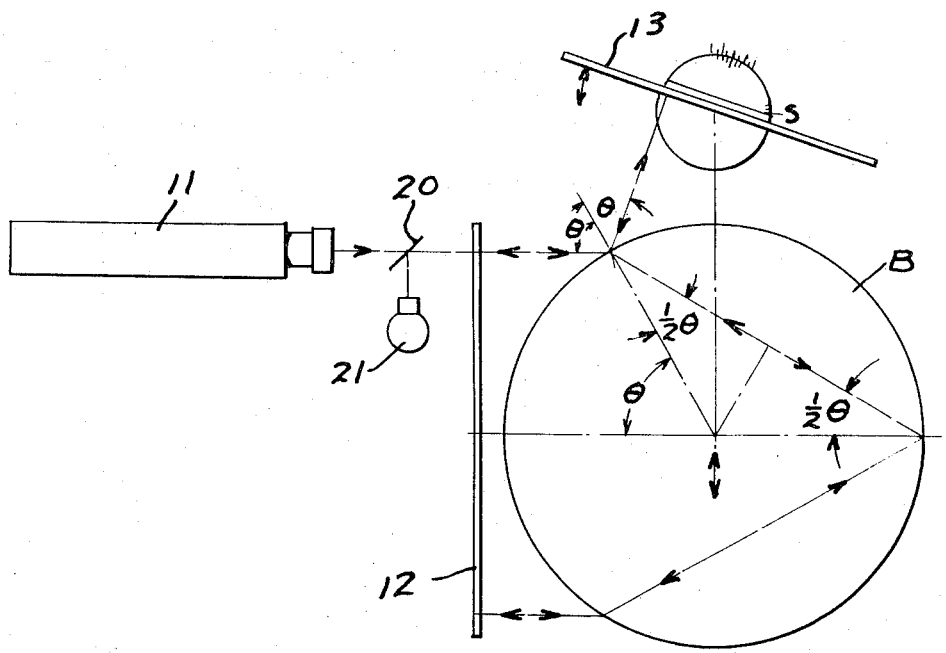

Referring to FIGS. 1 and 2, the apparatus embodying the invention comprises a base 10 including a source 11 of radiant energy to which the article is transparent, preferably monochromatic light, such as a laser, which directs a pencil of light having a cross sectional dimension on the order of 1.0 mm in diameter horizontally in spaced relationship to the base. A first mirror 12 is positioned in vertical position and is provided with a small transparent opening slightly larger than the diameter of the beam through which the beam is directed. A second mirror 13 is rotatably mounted on a rotary table 14 in vertical position and is adapted to be moved by a worm and gear mechanism 15 operated by rotating a handle 16. The rotary table 14 is provided with indicia 17 whereby the angular position of the table and the mirror with respect to the base can be determined.

The apparatus further includes a table 18 that can be translated by a worm and nut, not shown, rotated by a handle 19. The lens or disc B of transparent material, the refraction of which is to be determined, is positioned on the table 18 and fixed thereto by appropriate means such as clamps, not shown.

A beamsplitter 20 is provided in the path of the beam between the source 11 and mirror 12 and permits light from source 11 to pass therethrough and reflects light directed thereto in the opposite direction to an autocollimating light sensitive device or sensor 21.

In accordance with the invention, the periphery of the piece B is formed with a smooth cylindrical surface, the accuracy of the cylindrical surface affecting the index of refraction determination as presently described.

Before the lens or piece B is mounted on the table, the mirror 13 is adjusted so that it is perpendicular to the beam emanating from the source 11 (FIG. 1). This is achieved by use of the autocollimating action. The mirror 12 is rotated until the light reflected to the sensor 21 is autocollimated. Similarly, the mirror 13 is rotated until the light reflecting therefrom is autocollimated to the source. This is facilitated by the opening or portion of the mirror 12 which is transparent so that the position of the mirror can be accurately determined by redirecting the light from the mirror 13 to the source 11 through the transmitting opening in the mirror 12. The position of the mirror 13 is then noted and the mirror is rotated out of position.

The lens or disc B to be measured is then placed on the table 18. The disc B to be measured is brought up carefully into the light ray by rotating handle 19 until autocollimation is again achieved. There is one position where the refraction and reflection through the disc brings the ray to mirror 12 normally and thus back through so that the light is autocollimated. When this condition is satisfied, we see from FIG. 1 that the refracted angle is (½)$\theta$, where $\theta$ is the angle of incidence. Applying Snell's Law, we have $$n \sin[(½)\theta] = \sin \theta \qquad (1)$$

so that $$n = 2 \cos[(½)\theta] \qquad (2)$$

To measure $\theta$, mirror 13 is now rotated until autocollimation occurs on the reflected ray. The angular position of the new setting is read on the indicia 17. The difference in the two positions of mirror 13 is $\pi - 2\theta$ from which the index is computed by Equation (2).

From Equation (2), we can determine the accuracy which the index of refraction n may be measured by this method. Differentiation of $n$ with respect to the angle $\theta$ gives $$\Delta n = \sin\left[(\tfrac{1}{2})\theta\right]\Delta\theta \qquad (3)$$

for $n = 1.70$, this gives $$\Delta n = -0.527\Delta\theta \qquad (4)$$

Reading $\pi - 2\theta$ to within 1 arc second means we know $\theta$ to be 0.5 arc second. Calling $\Delta\theta = (0.00000485)(0.5)$ radians we have $$\Delta n = 0.00000128 \qquad (5)$$

This means that 1-second accuracies will give indices to one in the sixth decimal place.

The angular measurement involved in this invention to determine the index of refraction might be limited in accuracy by the roundness of the disc. It is necessary to know how round the disc must be in order to obtain the desired accuracies. A 3-inch diameter disc was considered and the autocollimated rays were traced on a computer. The system was altered slightly and then retraced to establish the autocollimation condition again. An index of 1.7000000 was used. A difference in the radius of curvature at the ray entrance from the ray exit position (which was more sensitive than other changes considered) by 0.001 inch resulted in an index change of $\delta n = 0.0001436$. The change corresponds to a disc diameter irregularity of 0.002 inch. If the disc diameter were uniform to a tolerance of 0.0001 inch, the index error would be $\delta n = 0.0000072$. This error might be further reduced by taking repeated measurements at different orientations of the disc.

Thus, with the angle measurement to 1 second on a disc sample round to 0.0001 inch, the index is determined to a few units in the sixth decimal. With more care, much greater accuracies are obtainable.

We claim:

1. An apparatus for measuring index of refraction comprising
   a light source for directing a beam of radiant energy to which the article is transparent,
   a first mirror having a reflective surface at a right angle with respect to said beam,
   a second mirror rotatably mounted for movement into and out of a position with its reflective surface at a right angle to the beam,
   a support for an article the index of refraction of which is to be measured,
   and means for moving said support with respect to said beam,
   and means for sensing when the beam from said light source is autocollimated back toward the light source,
   whereby when the article being measured is positioned such that light is refracted by one portion of the peripheral surface thereof, internally reflected, thereafter refracted to the first mirror and then returned along an identical path, the second mirror can thereafter be rotated to autocollimate the light reflected by the article so that the angular relationship between the position of the second mirror when it is parallel and the final position corresponds to $(\pi - 2\theta)$ where $\theta$ is the angle of incidence so that the index of refraction can be determined by the formula $n = 2\cos\left[(\tfrac{1}{2})\theta\right]$.

2. The combination set forth in claim 1 including scale means for indicating the angular position of said second mirror.

3. The combination set forth in claim 1 wherein said means for sensing autocollimation comprises a beamsplitter and a light sensor in the path of the light reflected by the beamsplitter.

4. The combination set forth in claim 1 wherein said first mirror is mounted for rotation about an axis parallel to the axis of rotation of said second mirror.

5. The combination set forth in claim 1 wherein said first mirror is provided with an area of greater transmission, said beam normally passing through said area toward the article being measured.

6. The combination set forth in claim 1 wherein said light source is monochromatic.

7. The combination set forth in claim 6 wherein said light source comprises a laser.

8. An apparatus for measuring index of refraction of an article comprising
   a monochromatic light source for directing a beam of radiant energy to which the article is transparent,
   a first mirror rotatably mounted for movement into and out of a position with its reflective surface at a right angle with respect to said beam,
   said first mirror being provided with an area of greater transmission, said beam normally passing through said area toward the article being measured,
   a second mirror rotatably mounted about an axis parallel to the axis of rotation of said first mirror for movement into and out of a position with its reflective surface at a right angle to the beam,
   a support for an article the index of refraction of which is to be measured,
   and means for moving said support with respect to said beam,
   means for sensing when the beam from said light source is autocollimated back toward the light source,
   whereby the article being measured is positioned such that light is refracted by one portion of the peripheral surface thereof, internally reflected, thereafter refracted to the first mirror and then returned along an identical path, the second mirror can thereafter be rotated to autocollimate the light reflected by the article so that the angular relationship between the position of the second mirror when it is parallel and the final position corresponds to $(\pi - 2\theta)$ where $\theta$ is the angle of incidence so that the index of refraction n can be determined by the formula $n = 2\cos\left[(\tfrac{1}{2})\theta\right]$.

9. The combination set forth in claim 8 including scale means for indicating the angular position of said second mirror.

10. The combination set forth in claim 8 wherein said means for sensing autocollimation comprises a beamsplitter and a light sensor in the path of the light reflected by the beamsplitter.

11. The method of measuring the index of refraction of a round article of material which comprises
    directing a beam of radiant energy to which the article is transparent against a peripheral surface of said article at an acute angle to a tangent thereto,
    moving the article relative to the beam in a direction transverse thereto until the article is in a position wherein the light is autocollimated by a mirror positioned with its plane at a right angle to the light beam, thereafter moving a second mirror until the light reflected from said article when it is in said position is autocollimated, measuring the angular position of said second mirror, and determinging the index of refraction $n$ by the relationship $n = 2 \cos[(½)\theta]$ wherein $\theta$ is the angle of incidence and $(\pi - 2\theta)$ is the angle of movement of the second mirror from a relationship wherein its reflective surface is perpendicualr to said beam to the position wherein the reflected light is autocollimated.

12. The method of measuring the index of refraction of a round article of material which comprises forming a beam of radiant energy, aligning a first mirror so that its reflective surface is at a right angle to said beam, directing a beam of radiant energy to which the article is transparent against a peripheral surface of said article at an acute angle to a tangent thereto, moving the article relative to the beam in a direction transverse thereto until the article is in a position wherein the light is autocollimated by refraction, internal reflection, refraction to said first mirror and reflection therefrom along an identical path, thereafter moving a second mirror until the light reflected from said article when it is in said position is autocollimated, measuring the angular position of said second mirror, and determing the index of refraction $n$ by the relationship $n = 2 \cos[(½)\theta]$ wherein $\theta$ is the angle of incidence and $(\pi - 2\theta)$ is the angle of movement of the second mirror from a relationship wherein its reflective surface is perpendicular to said beam to a position wherein the reflected light is autocollimated.

* * * * *

PO-1050
(5/69)

UNITED STATES PATENT OFFICE
CERTIFICATE OF CORRECTION

Patent No. 3,784,308      Dated January 8, 1974

Inventor(s) William H. Southwell and Richard M. Walters

It is certified that error appears in the above-identified patent and that said Letters Patent are hereby corrected as shown below:

Column 1, line 45 (after the word "wherein") "n$\theta$" should be --- n ---.

Signed and sealed this 17th day of September 1974.

(SEAL)
Attest:

McCOY M. GIBSON JR.
Attesting Officer

C. MARSHALL DANN
Commissioner of Patents